United States Patent [19]

Hurkmans et al.

[11] 4,308,548
[45] Dec. 29, 1981

[54] ELECTRODE ASSEMBLY HAVING PARTICULAR PRESSING PLATE AND BACKPLANE BOARD ARRANGEMENT FOR FACSIMILE MACHINE

[75] Inventors: Antoon M. Hurkmans, Bethlehem; Douglas R. Arnoldi, Southbury, both of Conn.

[73] Assignee: Burroughs Corporation, Detroit, Mich.

[21] Appl. No.: 59,760

[22] Filed: Jul. 23, 1979

[51] Int. Cl.³ .................................... G01D 15/06
[52] U.S. Cl. ............................ 346/153.1; 346/155
[58] Field of Search ............... 346/150, 153, 154, 155, 346/165, 139 C, 153.1

[56] References Cited

U.S. PATENT DOCUMENTS

| 3,693,181 | 9/1972 | Marshall | 346/155 |
|---|---|---|---|
| 3,774,229 | 11/1973 | Blackwood | 346/155 |
| 3,824,602 | 7/1974 | Gulati | 346/139 C |
| 3,827,056 | 7/1974 | Vano | 346/165 |
| 3,953,861 | 4/1976 | Kipling | 346/139 C |
| 4,013,158 | 3/1977 | Strange | 346/139 C |
| 4,183,032 | 1/1980 | Ohbori | 346/155 |

FOREIGN PATENT DOCUMENTS 2838241  1/1978  Fed. Rep. of Germany ... 346/139 C

Primary Examiner—Aristotelis M. Psitos
Attorney, Agent, or Firm—Kevin R. Peterson; Robert A. Green

[57] ABSTRACT

The assembly includes a stylus board which comprises an insulating board which carries a plurality of styli, and a backplane board which is made up of a plurality of electrode strips carried by an insulating sheet and positioned to contact the array of styli with a sheet of paper between them for receiving electrostatic charge as a result of electrical signals applied to the styli and the backplane electrodes. To provide intimate and uniform contact between the stylus board and the backplane board, the backplane board has a rubber backing strip, by means of which pressure is applied thereto to cause the desired close and uniform contact between it and the stylus board.

4 Claims, 9 Drawing Figures

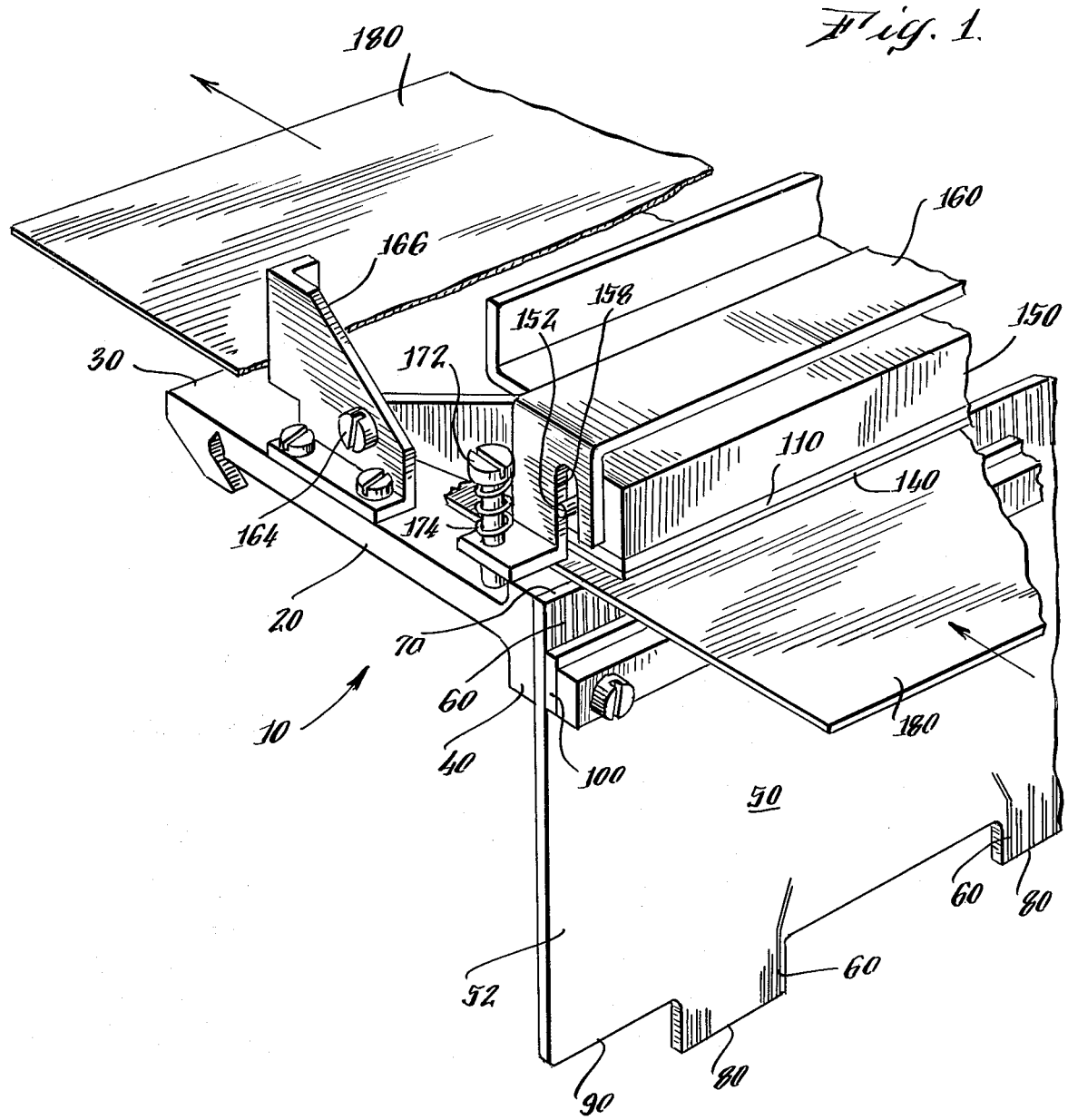

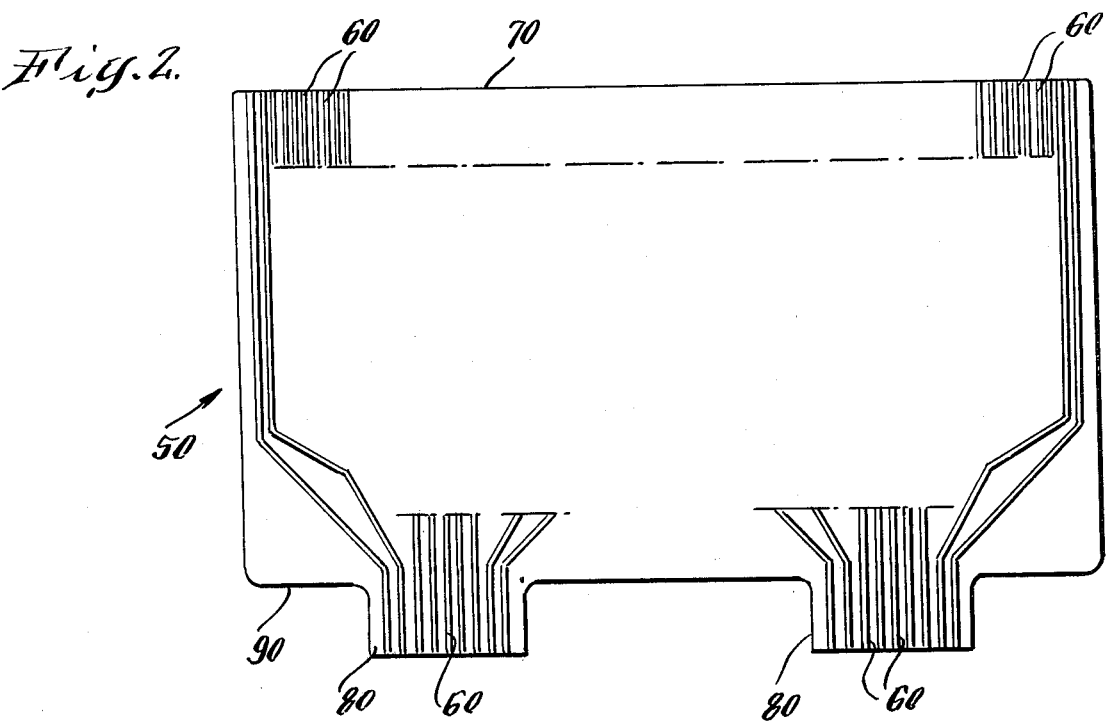
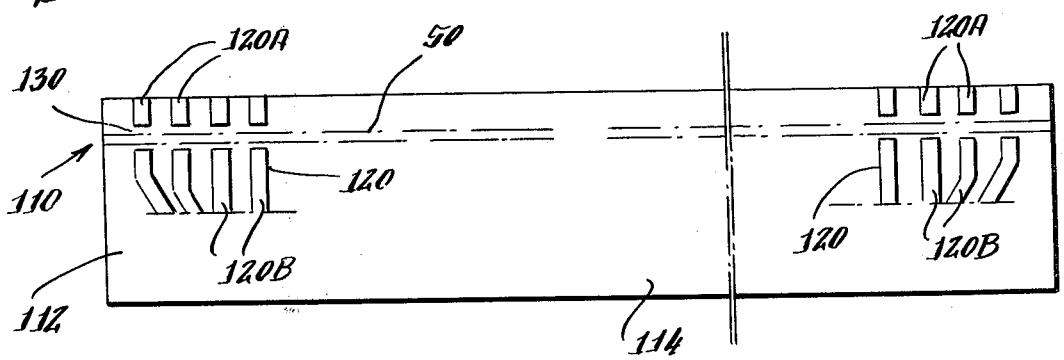
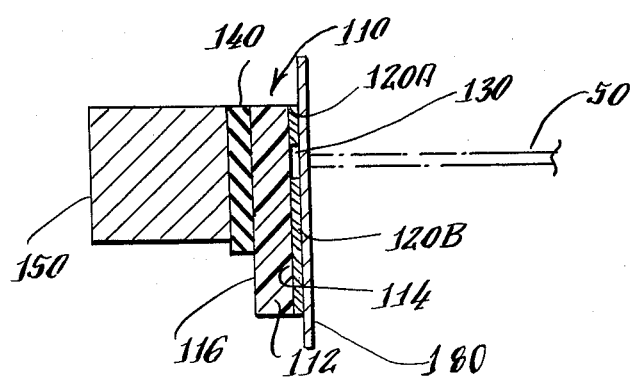

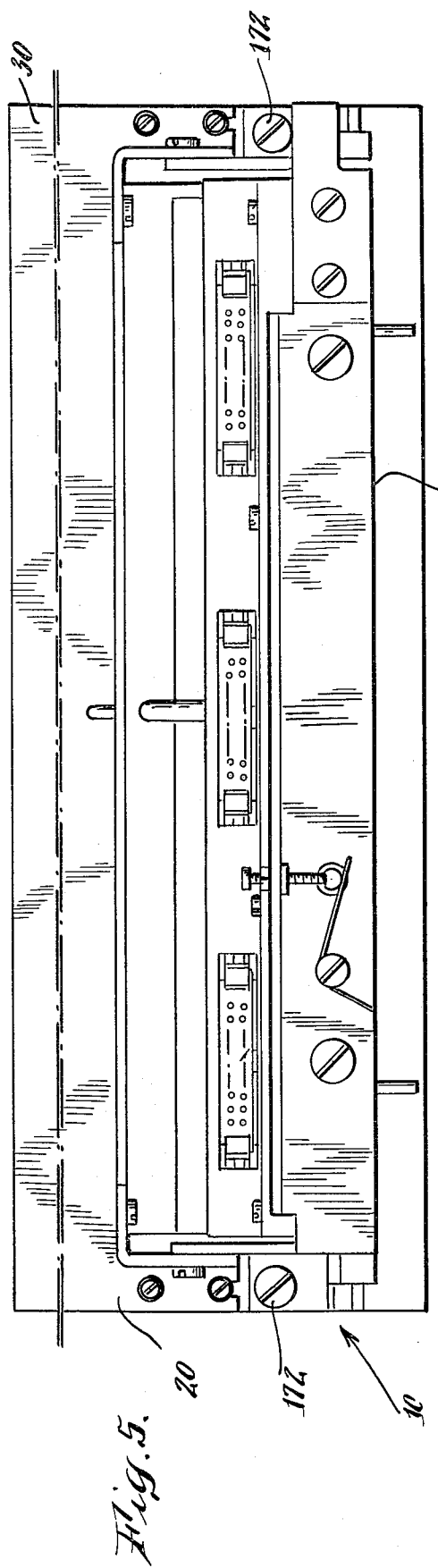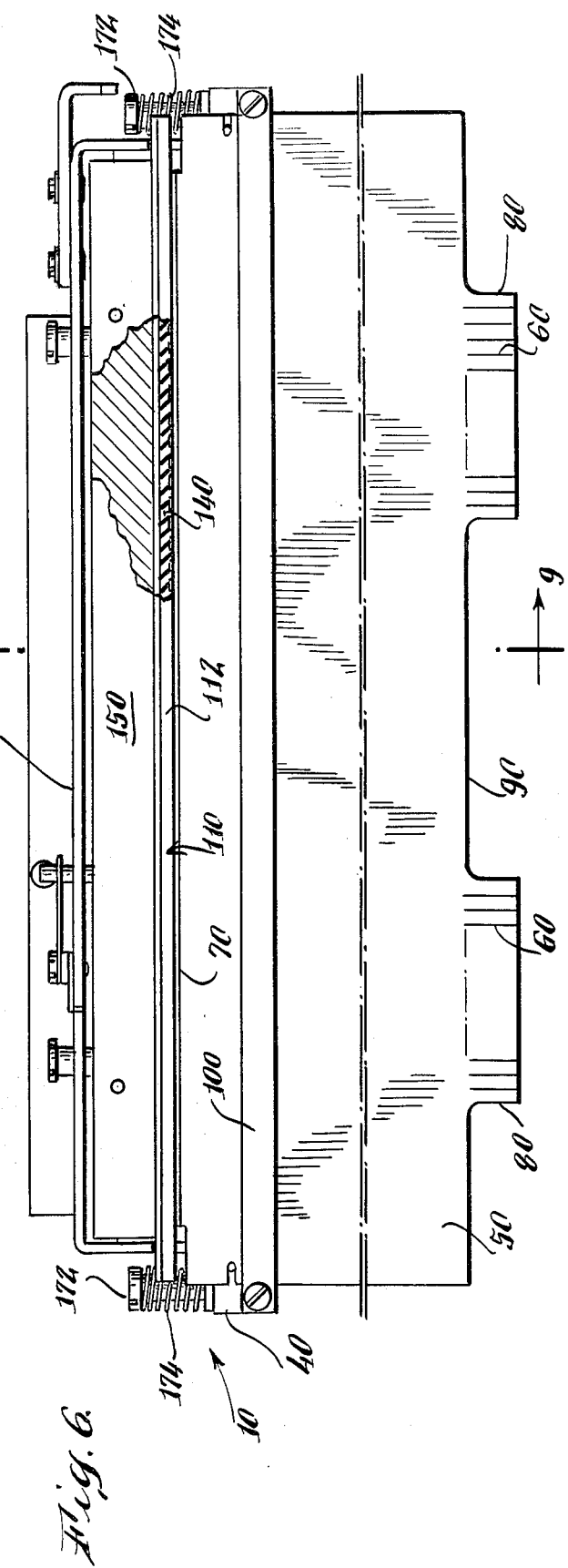

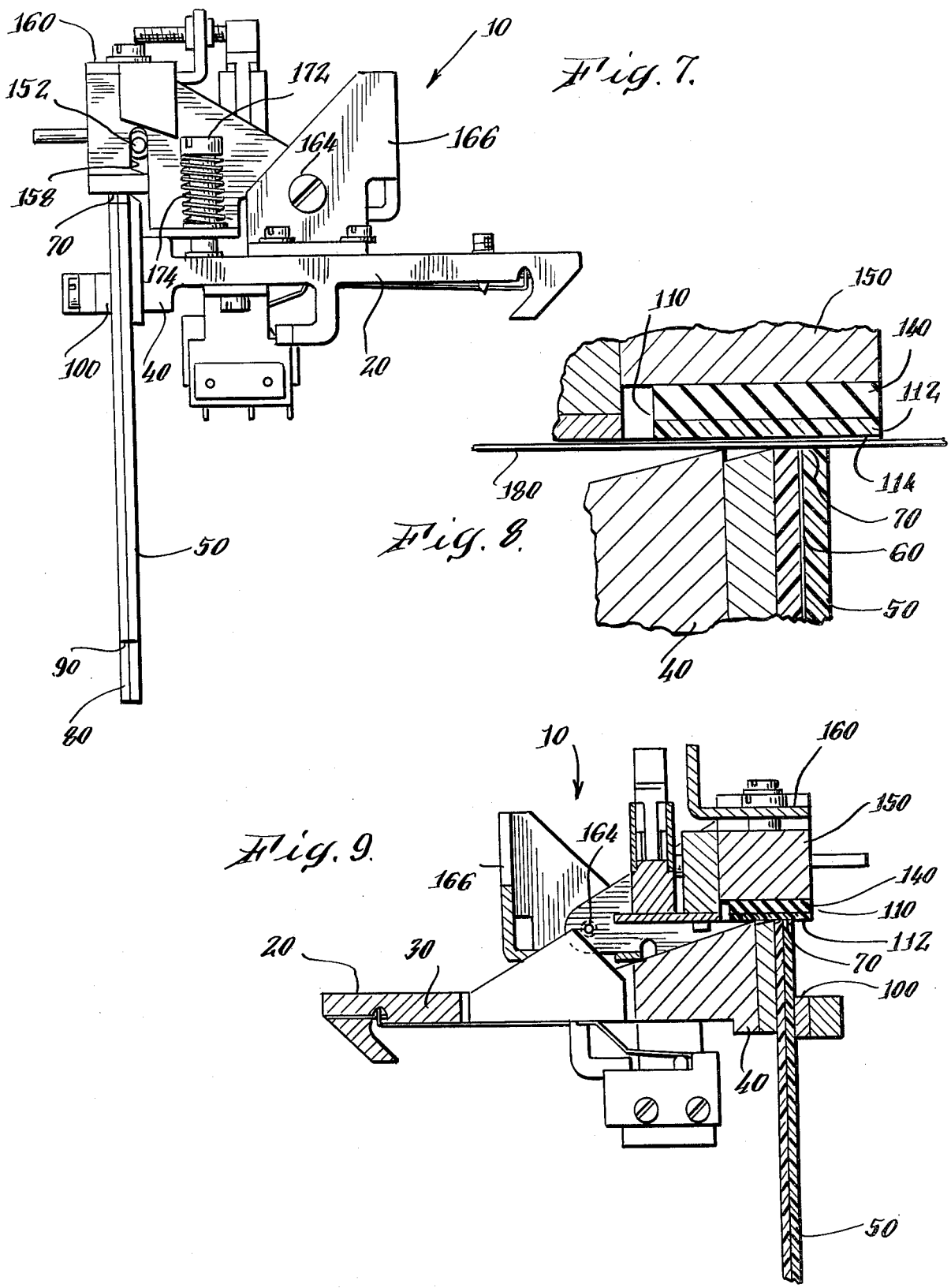

ELECTRODE ASSEMBLY HAVING PARTICULAR PRESSING PLATE AND BACKPLANE BOARD ARRANGEMENT FOR FACSIMILE MACHINE

BACKGROUND OF THE INVENTION

One known type of facsimile machine utilizes paper-charging apparatus which includes a stylus board made up of an insulating board which carries a large number of fine styli which operates with a backplane board made up of an insulating board which carries a plurality of small-area backplane electrodes. The two boards have a sheet of paper between them, and they are energized to provide charging signals which charge the paper. The styli all terminate at an edge of the stylus board, and it is necessary for the styli to make intimate contact with the recording paper along the entire length of the backplane board or at least be uniformly spaced therefrom along their mating lengths. This has been difficult to achieve, and relatively costly and time-consuming steps have been required to attempt to solve the problem.

The present invention solves the problem and provides intimate operating contact between the styli and the paper by providing a compliant material which holds the backplane, the paper, and the styli in uniform contact.

DESCRIPTION OF THE DRAWINGS

FIG. 1 is a perspective view of the invention;

FIG. 2 is a front elevational view of a stylus board used in FIG. 1;

FIG. 3 is a front elevational view of a backplane board used in FIG. 1;

FIG. 4 is a sectional elevational view of a portion of the apparatus of FIG. 1;

FIG. 5 is a top view of the apparatus of FIG. 1;

FIG. 6 is a front elevational view of the apparatus of FIG. 1;

FIG. 7 is a side elevational view of the apparatus of FIG. 1;

FIG. 8 is a sectional view of a portion of the apparatus of FIG. 7; and

FIG. 9 is a sectional view along the lines 9—9 in FIG. 6.

DESCRIPTION OF THE PREFERRED EMBODIMENTS

The electrostatic paper-charging apparatus of the invention 10 includes a metal support plate 20 having a large-area main body portion 30 and a T-shaped support bar 40 along one edge.

The apparatus 10 includes a stylus board 50 which comprises a sheet of insulating material, of the type normally used in a printed circuit board, having a front surface 52 on which are formed, by printed circuit techniques, a large number of styli 60 (FIG. 2). The styli (not all are shown) are disposed across the length of the board and are in the form of thin metal conductors which are insulated from each other and terminate at the upper edge 70 of the board. The styli are also connected to plug-in edge connectors 80 disposed along the opposite edge 90 of the board. The shape and electrical connections of the styli are not critical as far as the present invention is concerned.

The stylus board 50 is placed in contact with the T-shaped portion 40 of the support plate and is held in place by means of a cross bar 100 which extends across the board in contact therewith and is secured to the T-shaped member.

The apparatus 10 also includes a backplane board 110 which comprises a strip 112 of insulating material, preferably flexible, to permit intimate engagement with stylus board 50. The strip 112 has a front surface 114, on which is formed a plurality of parallel backplane electrodes 120, each of which is in two parts 120A and 120B, with a small gap 130 between the parts, the gap being adapted to receive the stylus board, as represented by the dash lines in FIG. 3. The backplane board 110 is mounted transverse to the stylus board 50, as seen in FIGS. 1 and 5-9.

According to the invention, a strip 140 of flexible material such as foam rubber or the like is secured to the rear surface 116 of the backplane board 110, extending along the length thereof behind the backplane electrodes 120. The assembly of backplane board and rubber strip 140 is secured to a metal plate 150, with the rubber strip engaging the metal plate and cemented thereto. The plate 150 has, at its ends, pins 152, which are disposed in slots 158 in bracket 160. The weight of the plate 150 causes the backplane board to press against the stylus board and provide intimate contact with the styli along its length.

The bracket 160 is pivotally coupled by pin 164 to a bracket 166, secured to plate 20, and it is guided on a pin 172 which carries a spring 174 which biases the bracket 160 and its component parts downwardly. The pin and bracket assemblies are provided at both ends of the apparatus 10.

In actual practice in one type of apparatus, the styli are provided in two sets, and two stylus boards are provided as shown in FIGS. 7-9. Two are not shown in FIGS. 1 and 4.

In operation of the apparatus 10, a sheet of paper 180 (shown in FIGS. 1 and 8) is moved line-by-line between the stylus board and the backplane board, and electrical signals applied to the electrodes carried by these boards provide lines of electrostatic charges. After the entire sheet has been charged, it is passed through a toner and fuser to render the electrostatic charge pattern visible and permanent.

One specific machine with which the apparatus of the invention may be used is known as the DEX 5100 machine of Burroughs Corporation. Portions of this machine are described and claimed in copending applications Ser. No. 21,493, filed Mar. 19, 1979 and Ser. No. 12,522, filed Feb. 15, 1979, which are incorporated herein by reference. The latter application illustrates one mode of operating electrically the stylus and backplane electrodes described herein.

What is claimed is:

1. Electrostatic printing apparatus comprising
a large-area support plate disposed horizontally and having a horizontal top surface and a vertical front surface,
a stylus board having an edge, along which a plurality of styli are disposed,
said stylus board being rigidly secured to said vertical front surface of said support plate, said stylus board being disposed vertically and its styli being disposed vertically,
a backplane board disposed transverse to said stylus board and in contact therewith, said backplane board having a rear surface and also having a front surface on which a plurality of backplane electrodes are positioned in operative relationship with said styli, said stylus board and said backplane board being adapted to receive a sheet of message paper between them, a strip of resilient material disposed along said rear surface of said backplane board in alignment with said backplane electrodes, and means pressing on said strip of resilient material and causing said backplane board to bear against said stylus board, said means comprising an elongated plate bearing on said strip and said backplane board under the force of gravity.

2. The apparatus defined in claim 1 wherein said resilient material is foam rubber.

3. The apparatus defined in claim 1 and including a pair of pins on said large-area support plate, a horizontal bracket overlying said elongated plate, said bracket including tabs engaging said pins, and springs on said pins engaging said tabs and biasing said bracket toward said large-area support plate whereby said bracket presses on said elongated plate and thus said backplane board is pressed against said stylus board with a sheet of printing paper between the stylus board and the backplane board.

4. The apparatus defined in claim 3 wherein said elongated plate includes first and second pins extending laterally from the opposite ends thereof, and said bracket includes slots in which each of said pins is guided.

* * * * *